United States Patent Office 3,004,961
Patented Oct. 17, 1961

3,004,961
POLYMERIC MATERIAL AND METHOD
OF MAKING SAME
Murray Hauptschein, Montgomery County, Pa., assignor to Pennsalt Chemicals Corporation, Philadelphia, Pa., a corporation of Pennsylvania
No Drawing. Filed Sept. 24, 1957, Ser. No. 685,801
7 Claims. (Cl. 260—92.1)

This invention deals with new polymeric substances and with a method for making such substances. In particular, it is concerned with new copolymers of fluorinated unsaturated compounds and alkylene oxides, and a method for their manufacture. This application is a continuation-in-part of my application Serial Number 586,903 filed May 24, 1956 and now abandoned.

Fluorinated polymeric materials have become of increasing importance. Because of their high resistance to attack by corrosive substances and their stability at high temperatures, they are especially useful as lubricants, i.e. oils or greases, plastics, coatings, heat transfer media and elastomers, in applications where these properties are required.

In many instances however, the materials resulting from simple polymerization of fluorinated monomers cannot be satisfactorily plasticized by conventional plasticizers which do not have suitable temperature and corrosion resistance. In other instances, the introduction of fluorine into a monomer so changes the chemistry of the substance that polymerization is not possible, or is possible only with great difficulty.

It has now been discovered that certain fluorinated unsaturated compounds can be copolymerized with certain alkylene oxides to give new polymeric products useful inter alia as plastics, lubricants, elastomers and protective coatings. The novel polymers containing a number of oxygen atoms in the molecule are, in effect, internally plasticized. Moreover, by copolymerization with alkylene oxide, it has been found possible to obtain with relative ease polymeric products from fluoroolefins and diolefins which had hitherto been considered extremely difficult or impossible to polymerize.

Copolymers according to the invention have a molecular structure consisting essentially of an aggregation of units of the general formula

where X, Y, and Z are halogens selected from the group consisting of chlorine and fluorine, and at least one of X, Y, and Z is fluorine, where R is selected from the group consisting of alkyl, fluoroalkyl and chlorofluoroalkyl radicals each having not more than five carbon atoms, hydrogen, chlorine, vinyl, fluorovinyl, chlorofluorovinyl, aryl, chloroaryl, fluoroaryl, and chlorofluoroaryl radicals; where $R_1$, $R_2$, $R_3$, and $R_4$ are selected from the group consisting of alkyl, fluoroalkyl, chloroalkyl, and chlorofluoroalkyl radicals each having not more than three carbon atoms, and hydrogen, provided that where at least two of $R_1$, $R_2$, $R_3$, and $R_4$ are hydrogen, the remainder may also be selected from the group consisting of phenyl, chlorophenyl, fluorophenyl, and chlorofluorophenyl radicals; where $m$ and $n$ are integers between 1 and about 100, usually between 1 and about 10, and may be the same or different, and where $q$ is an integer between 2 and about 100, usually between about 5 and about 50.

The invention further includes a method for making novel polymeric products which comprises reacting an alkylene oxide having the general formula

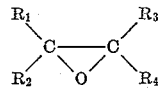

where $R_1$, $R_2$, $R_3$, and $R_4$ are as defined above, with an unsaturated fluorinated compound having the general formula $$CXY=CZR$$

where X, Y, Z, and R are as defined above.

Specific fluorinated olefins and diolefins which have been found especially satisfactory for polymerization according to the invention include, for example, trifluorochloroethylene, ($CF_2=CFCl$); perfluoropropene,

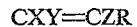

($CF_2=CHCl$); and perfluorobutadiene, $$(CF_2=CFCF=CF_2).$$

Examples of suitable alkylene oxides are ethylene oxide and propylene oxide.

It should be pointed out that products obtained in accordance with the present invention are true copolymers; i.e. the molecules are chains comprising a number of alternating olefin or diolefin and alkylene oxide units. They are therefore distinguished from polymeric materials formed by telomerization of olefins or diolefins, where the molecule is a chain of repeating olefin units with telogen terminal units. They are also distinguished from homopolymers where the molecule is a chain having only one repeating unit.

In carrying out the reaction, the reactants are simply brought together under favorable conditions. These conditions may involve the use of light, with or without ultra-violet components, heat, ionizing radiation, e.g. X, γ, or high energy electron radiation, or the effect of a chemical initiator of the free-radical forming type, such for example as di-tertiary-butyl peroxide, di-tertiary-butyl hydroperoxide, succinic acid peroxide, benzoyl peroxide, acetyl peroxide, hexachloroacetyl peroxide, or α,α'-azo-di-isobutyronitrile, or combinations of these agencies.

The reaction temperature may vary between about —80° C. and about 300° C., depending on the products desired and whether an initiator is used. Where heat alone is used as the initiating agent, the reaction is generally conducted above room temperature and usually above about 100° C. Where a chemical initiator is used, the temperature is that at which the initiator becomes effective.

The process may be carried out at substantially atmospheric pressure. However, the pressure is not critical and the reaction takes place at any of a wide range of pressures. If desired, the pressure may be from say 0.1 to 1000 atmospheres. In general, it is desirable to have sufficient pressure so that at least part of the reactants are in the liquid phase.

The reaction time depends on the particular reactants and on the other conditions of the reaction, and may vary from on the order of an hour to several weeks.

The ratio of fluorinated unsaturated compound to alkylene oxide used in the reaction mixture may vary widely and is determined by the ratio of these units desired in the final product.

Depending on the particular reactants, their proportions and the reaction conditions, the copolymer obtained may be a viscous oil, a gel, a grease, a wax, or soft, rubbery or hard solids. The oils, greases and waxes are generally useful as lubricants and are characterized by high thermal and chemical stability and good surface properties. The oils are also useful as heat stable plasticizers for synthetic resins, such for example as polyvinylidene chloride, or polyvinyl chloride. The waxes are useful in providing water-resistant coatings for wood, metal, or similar surfaces. The solids have a variety of uses as coatings, protective films and plastics.

The invention will be further described by means of the following specific examples, it being understood that the examples are given for purposes of illustration only and are not to be taken as in any way restricting the invention beyond the scope of the appended claims.

Example I

Chlorotrifluoroethylene (9.5 g. or 0.082 mole) and ethylene oxide (13.4 g. or 0.3 mole) were sealed in a Pyrex tube and exposed to a Hanovia ultra-violet lamp, 5 cm. from the tube, for 63 hours. 16.5 g. of a colorless viscous liquid was collected. No unreacted chlorotrifluoroethylene was detected. The liquid was dissolved in dichloromethane and extracted exhaustively with water. The lower layer obtained by extraction was separated, dried with anhydrous sodium sulfate and methylene chloride was evaporated off. The resulting jelly-like solid was heated at 100° in vacuo in an Abderhalden pistol. Upon analysis, the composition of the jelly was found to be (percent by weight) carbon 30.82; hydrogen 2.95. This corresponds to 46.8 mole percent of chlorotrifluoroethylene in the copolymer.

Example II

The procedure of Example I was repeated using 14.2 g. (0.12 mole) of chlorotrifluoroethylene and 4.4 g. (0.1 mole) of ethylene oxide. Only traces of unreacted olefin were detected. A glass-like soft polymer resulted in almost 100% yield. The copolymer thus obtained and the copolymer of Example I above, were insoluble in water, but soluble in ethyl ether, dichloromethane, and benzene. (Trifluorochloroethylene homopolymer is insoluble in benzene.) Both copolymers were attacked to a noticeable extent by concentrated sulfuric acid and 47% hydriodic acid at 150° C.

Upon analysis, the polymer was found to contain (percent by weight) carbon 26.81; hydrogen 1.79. This corresponds to 62.9 mole percent of chlorotrifluoroethylene in the copolymer. The properties of the copolymer make it useful in coatings and polishes.

Example III

Following the procedure of Example I, but replacing ethylene oxide with propylene oxide, similar results are obtained.

Example IV

Chlorotrifluoroethylene (59.0 g., 0.51 mole), ethylene oxide (43 g., 0.98 mole) and di-tertiary-butyl peroxide (3.8 g.) were heated at 125° C. for 60 hours. 72 g. of a jelly-like polymer were formed. Upon washing and drying, a translucent wax resulted, which upon analysis showed (percent by weight) carbon 28.40; hydrogen 2.11. This corresponds to 56.0 mole percent chlorotrifluoroethylene in the copolymer.

Example V

Equal volumes of chlorotrifluoroethylene and ethylene oxide were heated at 125° C. for one week. A soft solid product was obtained.

Example VI

Equal volumes of chlorotrifluoroethylene and ethylene oxide were exposed to the light from a 200 watt Mazda lamp at room temperature for a week. A soft solid was obtained.

Example VII

Equal volumes of chlorotrifluoroethylene and ethylene oxide were exposed out-of-doors in a Pyrex tube for one month (November). A soft solid product was obtained.

Example VIII

Perfluoropropene (62 g.), ethylene oxide (47 g.) and di-tertiary-butyl peroxide (6 g.) were heated at 145° C. for 72 hours. Approximately 54 g. of an oily polymer having a boiling point above 45° C. at below 0.5 mm. Hg were collected. Upon fractionation, it was found that about 35% of this material boiled at between 45 and 100° C. at 0.5 mm. Hg. This fraction had a refractive index of $n_D^{24}=1.3534$ and upon analysis was found to comprise (percent by weight) carbon 33.09; hydrogen 2.82, corresponding to 41.0 mole percent of perfluoropropene in the copolymer. The viscosity of this material at various temperatures was determined. These viscosities were 2.22 centistokes (cts.) at 212° F., 61.15 cts. at 62.0° F. and 279.3 cts. at 32.0° F. These values lie on a nearly straight line when plotted on an ASTM (D341–43) viscosity chart. The slope of this line, showing the temperature dependence of viscosity, i.e., the so-called ASTM slope, was 1.1. This shows improvement over other fluorocarbon oils.

A second fraction of the crude polymer, comprising about 50% of the crude, was found to boil at between 100 and 145° C., at 0.5 mm. The refractive index of this fraction was $n_D^{24}=1.3779$. Its densities were $d_4^{22}=1.466$, $d_4^0=1.494$. Upon analysis it was found to comprise (percent by weight) carbon 35.82; hydrogen 3.27; fluorine 45.6. This corresponds to 31.8 mole percent of perfluoropropene in the copolymer.

Example IX

Perfluoropropene (27 g., 0.18 mole) and ethylene oxide (9.0 g., 0.204 mole) were sealed in a Pyrex tube and irradiated with ultra-violet light for 133 hours. Approximately 16 g. of a clear viscous polymer having a boiling point slightly above 60° C. at <0.5 mm. were collected. After washing with water and drying, the product was fractionated. Approximately 30% of the raw polymer boiled at between about 100° and 110° C. at less than 0.5 mm. Hg. This material had a refractive index of $n_D^{20}=1.3699$. Upon analysis it was found to contain (percent by weight) carbon 33.63; hydrogen 2.74. This corresponds to 39.0 mole percent of perfluoropropene in the copolymer.

A second fraction, comprising about 15% of the crude polymer, was found to boil at 110 to 115° C. at less than 0.5 mm. Hg. This fraction had a refractive index of $n_D^{20}=1.3631$, and upon analysis was found to comprise (percent by weight) carbon 32.56; hydrogen 2.49; corresponding to 43.1 mole percent of perfluoropropene. The viscosity of this polymer was determined at several temperatures and found to be 4.52 cts. at 290° F., 16.49 cts. at 212° F. and 186.9 cts. at 141.5° F. Plotted on an ASTM (D341–43) viscosity chart, these values gave a slope of 1.0, indicating improvement over other fluorocarbon lubricants.

A third fraction comprising about 30% of the crude polymer boiled at between 115° and 180° C. at 0.5 mm. Hg. This fraction had a refractive index of $n_D^{20}=1.3620$. Upon analysis it was found to comprise (percent by weight) carbon 31.86; hydrogen 2.19; fluorine 56.88. This corresponds to 46.1 mole percent of perfluoropropene in the copolymer.

A dark residue comprising about 25% of the total crude polymer boiled above 180° C. at 0.5 mm. Hg. This was not investigated further.

Spectroscopic examination of the three lower boiling fractions showed the absence of any significant quantity of homopolymers of perfluoropropene or of ethylene oxide.

Example X 0.2 mole of perfluoropropene and 0.11 mole of ethylene oxide were irradiated with ultra-violet light, in a Pyrex tube for 8 days. The bulk of the product was found to be a 1:1 copolymer. Upon fractionation, a principal portion was found to boil between 60 and 100° C. at less than 0.5 mm. Hg. This fraction had a refractive index of $n_D^{23}$=1.3410. Analysis showed 31.2% by weight of carbon. For a 1:1 copolymer, the percentage of carbon would be 30.94. This copolymer was insoluble in water but soluble in organic solvents such as ethyl ether, dichloromethane and benzene.

A second fraction, boiling at between 100 and 150° C. at less than 0.5 mm. Hg. had a refractive index $n_D^{23}$=1.3568. This fraction had a carbon content of 31.2% by weight and a fluorine content of 60.1% by weight. For a 1:1 copolymer, the fluorine content would have been 58.74.

That the monomeric units of these 1:1 copolymers are interspersed uniformly and most probably are made up of alternating head-to-tail linkages, i.e.

$$(-C_3F_6-OCH_2CH_2-)_n$$

is supported by a number of observations. Thus, the copolymers do not react noticeably with concentrated sulfuric acid nor are they cleaved by heating at 150° C. for 24 hours in a sealed tube containing excess 47% hydriodic acid. This is in contrast to the known susceptibility of polyethylene glycols, i.e.

$$(-CH_2CH_2-OCH_2CH_2-)_n$$

to these reagents. The fact that the infra-red spectra of five different samples of copolymer (of varying degrees of polymerization) were essentially identical, is additional evidence that the repeating units are in a definite sequence, rather than being distributed at random.

Example XI

Ethylene oxide and perfluoropropene in a molar ratio of 4:1 were exposed to ultra-violet light in a Pyrex tube for 64 hours. Only traces of unpolymerized olefin were recovered. The principal high boiling products after washing and drying were (a) A fraction boiling between 100 and 115°, at less than 0.5 mm. Hg. This fraction had a refractive index of $n_D^{22}$=1.3840 and a carbon content of 36.95% by weight, corresponding to 28.5 mole percent of perfluoropropene in the copolymer.

(b) A fraction boiling at 115–150° C. at less than 0.5 mm. Hg. This fraction had a refractive index of $n_D^{21}$=1.3785. The carbon content was 35.75% by weight corresponding to 32.0 mole percent of perfluoropropene.

Example XII 15 cc. of perfluoropropene and 15 cc. of propylene oxide were sealed into a Pyrex glass tube and exposed to ultra-violet radiation for 224 hours. The following high boiling viscous oils were isolated.

*Fraction (1).*—1.22 g., boiled at 70–100° C. (<1 mm.), $n_D^{22.5}$=1.3836. Analysis: C, 40.5; H, 4.4; F, 42.3% by weight.

*Fraction (2).*—1.02 g., boiled at 101–135° C. (<1 mm.), $n_D^{23.0}$=1.3898. Analysis: C, 41.5; H, 4.6; F, 41.2% by weight. A 1:2 copolymer of perfluoropropene: propylene oxide would give the analysis C, 40.6; H, 4.5; F, 42.8% by weight.

*Fraction (3).*—The residue weighed 1 g. and was an immobile glass at room temperature. The infra-red spectra of fractions 1 and 2 were almost identical and were very similar to those of the copolymers of perfluoropropene and ethylene oxide.

Example XIII

Approximately 15 g. of perfluoropropene and 6 g. of propylene oxide (in a Pyrex tube) were exposed to ultra-violet light for about one month. Approximately 9 g. of perfluoropropene were recovered. About 4 g. of material boiling from 30° C. (760 mm. Hg) to 58° C. (0.1 mm. Hg), $n_D^{25}$=1.344 were obtained.

The following fractions were then collected by distillation at <0.1 mm. Hg pressure.

(1) 2.7 g., B.P. 58–100° C., $n_D^{25}$=1.3859
(2) 0.5 g., B.P. 100–122° C., $n_D^{25.5}$=1.3818
(3) 1.2 g., B.P. 122–141° C., $n_D^{25.5}$=1.3857
(4) 1.6 g., B.P. 141–200° C., $n_D^{25.5}$=1.3942
(5) 0.8 g., solid residue The infra-red spectra of the copolymer fractions 1 through 4 were almost identical to those of Example XII.

Example XIV

In a dry nitrogen atmosphere 11 g. (0.25 mole) of ethylene oxide and 37 g. (0.23 mole) of perfluorobutadiene were introduced into a heavy-walled Pyrex ampoule which was then sealed and exposed to a Hanovia ultra-violet lamp at about 5 cm. distance for one week. In addition to some unreacted starting materials, there was collected 8 g. of a polymeric residue. Upon analysis this was found to comprise carbon 33.83%; hydrogen 1.85%; fluorine 56.96%, these percentages being by weight. This corresponds to 57 mole percent of perfluorobutadiene.

The product was a pale buff paste. Upon heating at 0.1 mm. pressure with a free Bunsen flame, it remained stable, neither coloring nor melting to a clear liquid. Infra-red examination indicated the presence of $CF_2$ and $CH_2$ groups, with substantial amounts of unsaturation.

The polymer is suitable for vulcanization to form a highly stable rubber.

Example XV

In a dry nitrogen atmosphere, 11.2 g. (0.114 mole) of $CF_2=CHCl$ and 4.4 g. (0.1 mole) of ethylene oxide were sealed in a heavy-walled Pyrex ampoule and exposed to a Hanovia ultra-violet lamp at about 5″ distance for 8 days. In addition to 3.8 g. of unreacted starting materials,

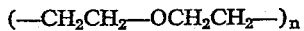
(2.5 g. of $CF_2CHCl$ and 1.3 g. $CH_2CH_2O$)

and 2.2 g. of material boiling between 30 and 105° C. at 10 mm. Hg ($n_D^{24}$=1.4083), there is collected as residue 8.2 g. of a viscous oil remarkable for its stability and clarity. This oil had a boiling point above 105° C. at 3 mm. Hg and a refractive index of $n_D^{20}$=1.447. Upon analysis it was found to comprise carbon 33.1% by weight and hydrogen 3.9% by weight. For a 1:1 copolymer, the corresponding percentages would be carbon 33.7 and hydrogen 3.6.

The infra-red spectrum of this oil indicated the presence of $CH_2$ and $CF_2$ groups. The kinematic viscosity of the oil was measured at various temperatures and found to be 9200 cts. at 100° F., 806.1 cts. at 141.4° F., 93.9 cts. at 197.8° F. and 65 cts. at 210° F. The ASTM slope, showing dependence of viscosity on temperature was 0.86 (viscosity index=118). This compares favorably with known fluorocarbon lubricants.

Example XVI 11 g. of $CF_2=CHCl$ and 4.4 g. of ethylene oxide were exposed outdoors from November 1 to December 14. In addition to recovering 13.4 g. of starting materials, 0.3 g. of a very stable pale amber wax was collected. This wax had a boiling point greater than 160° at 0.1 mm. Hg. Infra-red examination indicated the presence of $CH_2$ and $CF_2$ groups.

Example XVII 28.9 g. (0.248 mole) of chlorotrifluoroethylene, and 8.4 g. (0.191 mole) of ethylene oxide were irradiated for about two weeks with ultra-violet radiation in a Pyrex tube. There was obtained approximately 24 g. of a white solid having a softening point between 156 and 177° C.

Example XVIII 29.1 g. of chlorotrifluoroethylene and 11.4 g. of ethylene oxide were treated as indicated in Example XVII for four days. About 30 g. of a white gel-like solid resulted. This solid turned pale yellow when heated over silica gel at 100° C. in vacuo. It had a softening point of 75–125° C.

Example XIX 15 cc. of chlorotrifluoroethylene and 15 cc. propylene oxide were exposed to ultra-violet radiation for 72 hours. There was obtained 4.5 g. of white powder having a softening point 135–170° C. which dissolved in hot benzene.

Example XX

A procedure as indicated in Example XVII was carried out using 29.0 g. of chlorotrifluoroethylene and 11 g. of ethylene oxide as well as 0.05 mm. of a terpene inhibitor. No visible solid product was noted until four days had passed although under similar conditions, but without an inhibitor, product appeared after a few hours. The tube was then exposed to ultra-violet light in a Pyrex tube for an additional two days and there was collected 39.0 g. of an amber-colored tacky solid residue which was dried at 100° C. in vacuo in a pistol over silica gel. This solid had a softening point of 60–80° C.

Example XXI 32 g. (0.213 mole) of perfluoropropene and 4.4 g. (0.1 mole) of ethylene oxide were irradiated with ultra-violet light in a Pyrex tube for about one month. Approximately 19 g. of perfluoropropene were recovered. 7.2 g. of material boiling from 30° C. (760 mm.) to 50° C. (0.1 mm.), $n_D^{25}=1.339$, were obtained.

The following fractions ranging in consistency from oils to tacky solids were collected by distillation at less than 0.1 mm.

(1) A 1.4 g. fraction having a boiling point of 48–100° C. at less than 0.1 mm., and an index of refraction, $n_D^{25}=1.3392$. Analysis showed: C, 30.2; H, 2.4; F, 62.5% by weight.

(2) A 0.3 g. fraction having a boiling point of 100–125° C. at less than 0.1 mm. and an index of refraction, $n_D^{25}=1.3474$.

(3) A 3.1 g. sample having a boiling point of 124–135° C. at less than 0.1 mm., and an index of refraction, $n_D^{25}=1.3554$. Analysis: C, 30.8; H, 2.5; F, 58.6% by weight. A 1:1 copolymer of perfluoropropene and ethylene oxide would give C, 30.9; H, 2.1; F, 58.7% by weight.

(4) A 2.2 g. sample having a boiling point of 135–200° C. at less than 0.1 mm. and an index of refraction, $n_D^{25}=1.3599$.

(5) 2.4 g. of solid residue.

The infra-red spectra of fractions 1 to 4 were almost identical and were similar to those of copolymers of perfluoropropene and propylene oxide.

What is claimed is:

1. A copolymer of an alkylene oxide, said alkylene oxide consisting solely of carbon, hydrogen and oxygen and having not more than five carbon atoms in the molecule and a fluorinated unsaturated compound selected from the group consisting of trifluorochloroethylene, perfluoropropene, 1,1-difluoro-2-chloroethene and perfluorobutadiene, the molar proportion of alkylene oxide to fluorinated unsaturated compound being from about 1:100 to 100:1 and there being at least two alkylene oxide units in the copolymer molecule.

2. A copolymer of ethylene oxide with chlorotrifluoroethylene, said copolymer having at least two ethylene oxide units per molecule.

3. A copolymer of ethylene oxide with perfluoropropene, said copolymer having at least two ethylene oxide units per molecule.

4. A copolymer of ethylene oxide with 1,1-difluoro-2-chloroethene, said copolymer having at least two ethylene oxide units per molecule.

5. A copolymer of ethylene oxide with perfluorobutadiene, said copolymer having at least two ethylene oxide units per molecule.

6. A copolymer of chlorotrifluoroethylene with propylene oxide, said copolymer having at least two propylene oxide units per molecule.

7. A copolymer of perfluoropropene with propylene oxide, said copolymer having at least two propylene oxide units per molecule.

References Cited in the file of this patent

UNITED STATES PATENTS

| | | |
|---|---|---|
| 2,456,255 | Coffman et al. | Dec. 14, 1948 |
| 2,694,701 | Blum et al. | Nov. 16, 1954 |

FOREIGN PATENTS

| | | |
|---|---|---|
| 583,874 | Great Britain | Jan. 1, 1947 |

OTHER REFERENCES

Hauptschein et al., J. Am. Chem. Soc. 78, 676, Feb. 5, 1956.